(12) United States Patent
Liu

(10) Patent No.: US 10,393,954 B2
(45) Date of Patent: Aug. 27, 2019

(54) LIGHT GUIDING STRUCTURE, BACKLIGHT SOURCE AND DISPLAY DEVICE

(71) Applicants: BOE Technology Group Co., Ltd., Beijing (CN); Hefei BOE Display Light Co., Ltd., Anhui (CN)

(72) Inventor: Xiang Liu, Beijing (CN)

(73) Assignees: BOE TECHNOLOGY GROUP CO., LTD., Beijing (CN); HEFEI BOE DISPLAY LIGHTING CO., LTD., Anhui (CN)

( * ) Notice: Subject to any disclaimer, the term of this patent is extended or adjusted under 35 U.S.C. 154(b) by 0 days.

(21) Appl. No.: 15/233,989

(22) Filed: Aug. 11, 2016

(65) Prior Publication Data

US 2017/0192165 A1  Jul. 6, 2017

(30) Foreign Application Priority Data

Jan. 4, 2016  (CN) .......................... 2016 1 0008880

(51) Int. Cl.
*F21V 8/00* (2006.01)
(52) U.S. Cl.
CPC .......... *G02B 6/0091* (2013.01); *G02B 6/0068* (2013.01); *G02B 6/0073* (2013.01)
(58) Field of Classification Search
CPC ............................ G02B 6/0091; G02B 6/0021
See application file for complete search history.

(56) References Cited

U.S. PATENT DOCUMENTS

| 2007/0165424 | A1 | 7/2007 | Sakai | |
|---|---|---|---|---|
| 2009/0016079 | A1* | 1/2009 | Mizutani | G02B 6/0021 362/617 |
| 2012/0182497 | A1* | 7/2012 | Qi | G02B 6/0021 349/62 |

(Continued)

FOREIGN PATENT DOCUMENTS

| CN | 2654438 Y | 11/2004 |
|---|---|---|
| CN | 2769941 Y | 4/2006 |
| CN | 200955715 Y | 10/2007 |

(Continued)

OTHER PUBLICATIONS

Machine translation of CN 104375232 (Year: 2015).*

(Continued)

*Primary Examiner* — Anh T Mai
*Assistant Examiner* — Zachary J Snyder
(74) *Attorney, Agent, or Firm* — Westman, Champlin & Koehler, P.A.

(57) ABSTRACT

A light guiding structure, a backlight source and a display device are provided. The light guiding structure includes a light guiding plate, wherein at least one side end surface of the light guiding plate is provided with a fixing mechanism configured to fix a light bar. In the above-described light guiding structure, since the fixing mechanism provided on the side end surface of the light guiding plate is fixed to the light bar, the light guiding plate is accurately aligned with the light bar. The operation difficulty of fixing the light guiding plate to the light bar by the fixing mechanism is reduced, thus, it is easy to achieve the accurate alignment between the light guiding plate and the light bar.

11 Claims, 2 Drawing Sheets

(56) References Cited

U.S. PATENT DOCUMENTS

2014/0226108 A1\* 8/2014 Itakura ................. G02B 6/0021
349/65

FOREIGN PATENT DOCUMENTS

| CN | 201599665 U | 10/2010 |
| --- | --- | --- |
| CN | 101943352 A | 1/2011 |
| CN | 104375232 \* | 2/2015 |
| CN | 104375232 A | 2/2015 |
| CN | 104728661 A | 6/2015 |

OTHER PUBLICATIONS

First Office Action, including Search Report, for Chinese Patent Application No. 201610008880.6, dated Apr. 2, 2018, 11 pages.
Second Office Action, including Search Report, for Chinese Patent Application No. 201610008880.6, dated Nov. 16, 2018, 20 pages.

\* cited by examiner

LIGHT GUIDING STRUCTURE, BACKLIGHT SOURCE AND DISPLAY DEVICE

CROSS-REFERENCE TO RELATED APPLICATION

This application claims the benefit of Chinese Patent Application No. 201610008880.6 filed on Jan. 4, 2016 in the State Intellectual Property Office of China, the whole disclosure of which is incorporated herein by reference.

BACKGROUND OF THE INVENTION

Field of the Invention

The present disclosure relates to a field of display technology, and specifically relates to a light guiding structure, a backlight source and a display device.

Description of the Related Art

An edge-type backlight source generally comprises a back plate, a light bar and an optical film layer. The light bar is generally provided with a plurality of spot light sources spaced apart from each other, and the optical film layer comprises a light guiding plate, a reflective layer, a diffusion plate, a prism film and the like. In particular, light ray is emitted into the light guiding plate from the spot light sources which are provided at least one edge of the light guiding plate, a part of the light ray is directed upwards, transmits through the diffusion plate and the prism film, and then is led out, and the remaining part of the light ray is directed downwards to the reflective layer, and finally is led out from above after being reflected, thus the light guiding plate is served as a surface light source.

In the prior art, in order to assemble the above-described backlight source, the is firstly fixed on the back plate, the light guiding plate is then manually moved to be close to the light bar, so that the light guiding plate is in contact with the spot light sources on the light bar as much as possible and a gap between the light guiding plate and the spot light sources is eliminated, thereby allowing the light ray emitted from the spot light sources to be directed into the light guiding plate to the maximum extent (or completely); the light guiding plate is fixed to the back plate by using an adhesive tape after the light guiding plate has been moved to a desired position.

During the above-described assembly of the backlight source, it is very difficult to accurately align the light guiding plate with the spot light sources on the light bar by a manual operation. The accurate alignment depends on experience and skill level of an operator. It costs more time and effort to implement aligning each time, resulting in relatively high labor intensity for the operator. In addition, it is also difficult for the above-described assembly process to make the light guiding plate and the spot source lights on the light bar in close contact with each other, and the gap therebetween cannot be completely eliminated, as a result, the light emitted from the spot light sources is directed into the light guiding plate by a relatively low ratio, resulting in a relatively low utilization rate of the light.

SUMMARY OF THE INVENTION

In view of solving at least the above or other drawbacks in the prior art, the present disclosure provides a light guiding structure, a backlight source and a display device, through which the operation difficulty of accurately aligning a light guiding plate and a light bar may be reduced, and the requirement of achieving alignment process for an operator is reduced accordingly.

According to an aspect of the present disclosure, there is provided a light guiding structure comprising a light guiding plate, wherein at least one side end surface of the light guiding plate is provided with a fixing mechanism configured for fixing a light bar.

According to another aspect of the present disclosure, there is provided a backlight source, comprising a light bar and the light guiding structure described above.

According to further another aspect of the present disclosure, there is provided a display device, comprising a display panel and the backlight source described above.

BRIEF DESCRIPTION OF THE DRAWINGS

The accompanying drawings are intended to provide a better understanding to the present disclosure, and form a portion of the specification. Furthermore, the accompanying drawings are used to explain the present disclosure in combination with the following embodiments, but not intended to limit the present disclosure. In the drawings.

DETAILED DESCRIPTION OF PREFERRED EMBODIMENTS OF THE INVENTION

The specific embodiments of the present disclosure will be described in detail with reference to the accompanying drawings. It should be noted that the embodiments described herein are only used for describing and explaining the present disclosure, rather than limiting the present disclosure.

Figure 1:
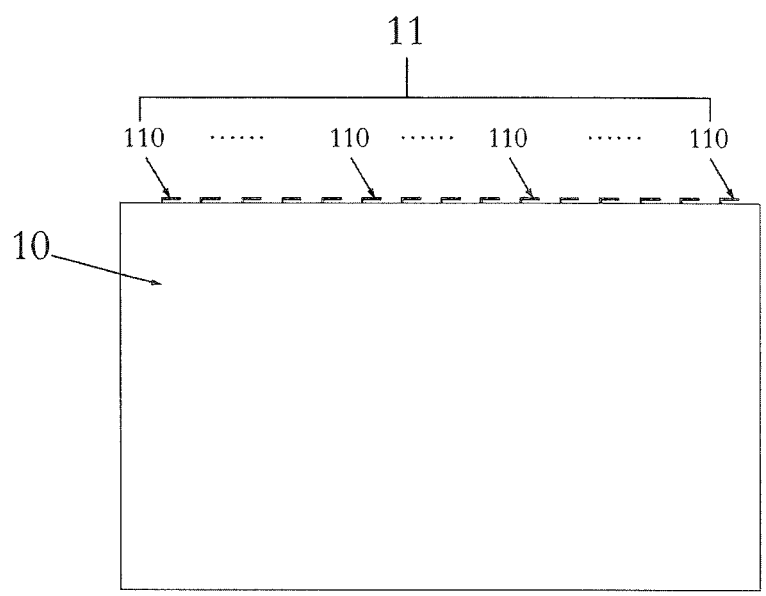
FIG. 1 is a schematic plan view of a light guiding structure according to an exemplary embodiment of the present disclosure.
Figure 2:
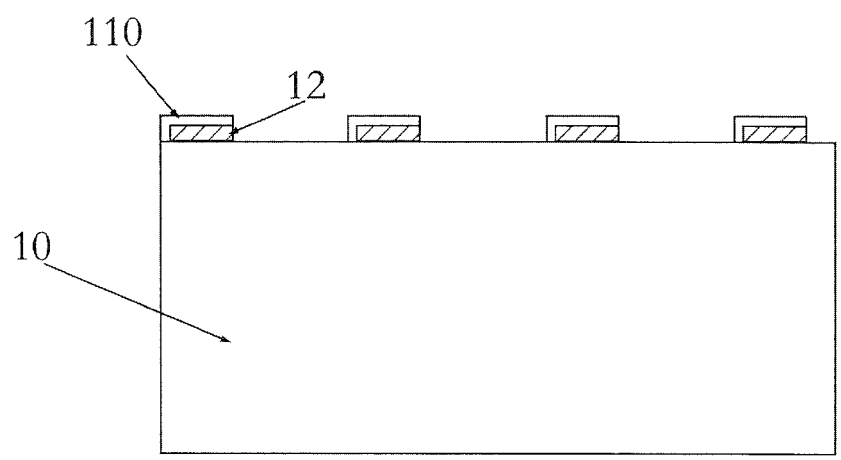
FIG. 2 is a schematic plan view of the light guiding structure shown in FIG. 1, with light bars fixed therein.

According to a general concept of the present disclosure, there is provided a light guiding structure. FIG. 1 is a schematic plan view of a light guiding structure according to an exemplary embodiment of the present disclosure; FIG. 2 is a schematic plan view of the light guiding structure shown in FIG. 1, with light bars fixed therein.

As shown in FIGS. 1 and 2, the light guiding structure comprises a light guiding plate 10, at least one side end surface of the light guiding plate 10 is provided thereon with a fixing mechanism 11 configured for fixing a light bar. Through such a fixing mechanism for fixing the light bar, the operation complexity of accurately aligning a light guiding plate and a light bar may be reduced, and the requirement of achieving alignment process for an operator may also be reduced.

In an embodiment, the light bar comprises a flexible printed circuit board (FPCB, not shown in the figures) and a plurality of spot light sources 12 fixed on the flexible printed circuit board. The spot light sources are embodied as light emitting diodes (LED). The fixing mechanism 11 comprises a plurality of fixing members 110 spaced apart from each other and configured for fixing the plurality of spot light sources 12 of the light bar, respectively.

Figure 3:
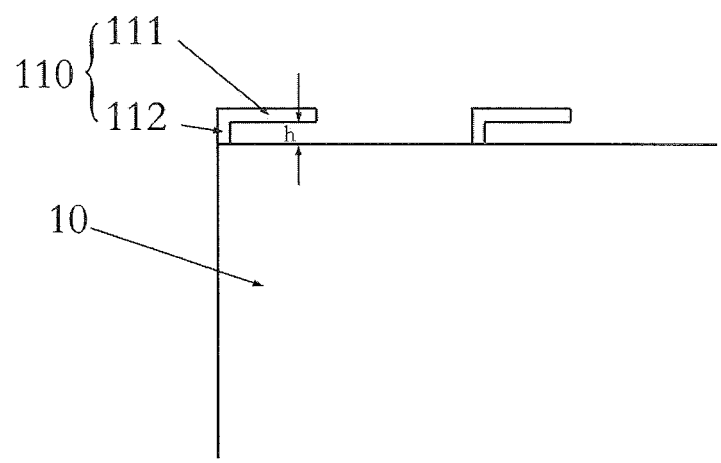
FIG. 3 is an enlarged schematic view showing the structure of a fixing member.

As shown in FIG. 3, each of the fixing members 110 has a substantially L-shaped profile, and comprises a fixing arm 111 and a connecting arm 112. The fixing arm 111 is arranged to be substantially in parallel with the side end surface of the light guiding plate 10, so as to hold the spot light source 12 between the fixing arm 112 and the side end surface of the light guiding plate 10. One end of the connecting arm 112 is fixed to the side end surface of the light guiding plate 10, and the other end of the connecting arm 112 is connected to the fixing arm 111, so that the fixing arm 111 is connected to the light guiding plate 10. Thus, the plurality of spot light sources 12 may be securely held on the side end surface of the light guiding plate 10 by the plurality of fixing members 110, so that all light ray emitted from the spot light sources 12 is directed into the light guiding plate 10.

In an embodiment, a gap between the fixing arm 111 and the light guiding plate 10 is used for receiving the spot light source 12. In specific, the distance h between the fixing arm 111 and the side end surface of the light guiding plate 10 is approximately equal to the thickness of the spot light source 12. Thus, when the light bar and the light guiding structure are fixed to each other, the side end surface of the light guiding plate 10 is in direct contact with the spot light source 12, with no gap therebetween. In this way, all light ray emitted from the spot light sources 12 is directed into the light guiding plate 10, thereby achieving a maximum utilization rate of the light.

Further, the light emitting diode has a power not greater than 6 watts. In such a way, it may allow each LED to generate less heat during emitting light, to ensure that the temperature of the light guiding plate 10, which is in direct contact with the LED, does not rise significantly, thereby preventing the light guiding plate 10 from being damaged due to high temperature.

In an exemplary embodiment, the plurality of fixing members 110 are arranged in positions corresponding to the plurality of spot light sources 12 on the light bar, respectively, and openings, which are formed between free ends of the fixing arms of the plurality of fixing members 110 and the side end surface of the light guiding plate 12, have the same orientation. In other words, as shown in FIG. 2, the distance between two adjacent fixing members 110 is equal to the distance between two adjacent spot light sources 12 on the light bar, and the fixing arm 111 of each fixing member 110 extends in parallel with an upper surface or a lower surface of the light guiding plate 10, so that the openings of all the fixing member 110 open leftwards or rightwards. The length of the fixing arm of each fixing member 110 is arranged to be less than the distance between two adjacent spot light sources 12, so that each of the plurality of spot light sources 12 may be moved to a position between the fixing arm 111 and the side end surface of the light guiding plate 10 from a position between two fixing members 110 via a corresponding one of the openings. In such a way, during fixing the fixing member 110 to the spot light source 12, the fixing member 110 may be firstly placed between two adjacent spot light sources 12, then slid relative to the spot light source 12, finally the fixing arm 111 of the fixing member 110 is fixed to the spot light source 12.

During assembling the light guiding structure in the present embodiment to a backlight source, the light bar is firstly fixed on a back plate of the backlight source (now shown), at this time, the positions of all the spot light sources 12 on the light bar are determined; then, one side of the light guiding plate 10 of the light guiding structure having the fixing members 110 is pushed to move in a frame of the back plate for fixing the light bar, so that the fixing members 110 are in contact with the flexible printed circuit board of the light bar and each spot light source 12 is located near the opening of the corresponding fixing member 110; finally, the light guiding structure is pushed to move in an opening direction of the fixing member 110, so that each spot light source 12 is located in the corresponding fixing member 110, thereby the fixing and assembling of the light guiding structure and the light bar is achieved.

In the process of the assembly, the light guiding plate 10 may be accurately aligned with the light bar by the fixing mechanism 11 while the light guiding structure is mounted in the backlight source. Furthermore, the operation difficulty of fixing the light guiding plate 10 to the light bar by the fixing mechanism 11 is reduced, and the needed effort and time for the operator is significantly reduced, thereby reducing the labor intensity of the operator and the operation accuracy requirement for the operator.

In addition, in the process of assembling the light guiding structure to the backlight source, since the light guiding plate 10 is fixed to the light bar by the fixing mechanism 11, there is no need for an adhesive tape to adhere the light guiding plate 10 to the light bar, reducing the cost and improving the operation efficiency.

It should be noted that, in addition to the embodiment that only one side of the light guiding plate 10 is provided with the fixing mechanism 11 as shown in FIGS. 1 and 2, in alternative embodiments, two or more side end surfaces of the light guiding plate 10 each may be provided with a fixing mechanism 11. In such a way, the light ray may enter into the light guiding plate 10 from several side end surfaces thereof, and more spot light sources 12 may be provided in the backlight source to improve the brightness of the light exiting surface of the backlight source.

In an embodiment, the fixing member 110 and the light guiding plate 10 are integrally formed by injection molding. In such a way, the fixing member 110 and the light guiding plate 10 are securely connected to each other. Furthermore, through injection molding, the plurality of fixing member 110 may be simultaneously fixed to the light guiding plate 10. Of course, in addition to injection molding, the fixing member 110 may be connected to the light guiding plate 10 by any other manners, for example, by adhesion.

According to the light guiding structure of the above-described embodiments of the present disclosure, the fixing mechanism 11 provided on the side end surface of the light guiding plate 10 is fixed to the light bar, and the light guiding plate 10 may be accurately aligned with the light bar during fixing the light guiding structure to the backlight source. The operation difficulty of fixing the light guiding plate 10 to the light bar by the fixing mechanism 11 is reduced, thus, it is easy to achieve the accurate alignment between the light guiding plate 10 and the light bar. Furthermore, the needed effort and time for the operator is significantly reduced, thereby reducing the operation accuracy requirement for the operator and the labor intensity of the operator.

According to the light guiding structure of an exemplary embodiment of the present disclosure, the light bar may comprise a linear light source. In such a case, the fixing mechanism is directly fixed to the linear light source, so that the light guiding structure is mounted to the light bar and the accurate alignment between the light guiding plate and the light bar is achieved. The principle and method for mounting the light bar having the linear light source is similar to that of the above-described light bar having the spot light source, therefore, the description thereof is omitted herein.

According to another aspect of the present disclosure, there is provided a backlight source, comprising a light bar and the light guiding structure according to the above-described embodiments.

In the backlight source according to the embodiments of the present disclosure, since the light guiding structure according to the above-described embodiments of the present disclosure is adopted, the accurate alignment between the light guiding plate and the light bar is easily achieved, thereby reducing the operation accuracy requirement for the operator and the labor intensity of the operator.

According to further another aspect of the present disclosure, there is provided a display device, comprising a display panel and the backlight source according to the above-described embodiments.

In the display device according to the embodiments of the present disclosure, since the backlight source according to the above-described embodiments of the present disclosure is adopted, the accurate alignment between the light guiding plate and the light bar is easily achieved, thereby reducing the operation accuracy requirement for the operator and the labor intensity of the operator.

It should be understood that the above embodiments are merely exemplary embodiments intended to explain the principle of the present disclosure, however, the present disclosure is not limited thereto. Various modifications and alternatives may be made to the embodiments of the present disclosure without deviating from the spirit and scope of the present disclosure, and all the modifications and alternatives fall within the scope of the present disclosure.

What is claimed is:

1. A light guiding structure comprising a light guiding plate, wherein at least one side end surface of the light guiding plate is provided with a fixing mechanism configured to fix a light bar,
    wherein the light bar comprises a flexible printed circuit board and a plurality of spot light sources fixed on the flexible printed circuit board, and
    wherein the fixing mechanism comprises a plurality of fixing members spaced apart from each other and configured to fix the plurality of spot light sources of the light bar, respectively,
    wherein each fixing member has a substantially L-shaped profile and comprises:
        a fixing arm arranged to be substantially in parallel with the side end surface of the light guiding plate, so as to hold the spot light source between the fixing arm and the side end surface of the light guiding plate; and
        a connecting arm having one end fixed to the side end surface of the light guiding plate, and the other end connected to the fixing arm,
    wherein the fixing arm extends from a connecting portion of the fixing arm and the connecting arm to a free end of the fixing arm in a direction parallel to an intersecting edge between a light-emitting surface of the light guiding plate and the side end surface,
    wherein the plurality of fixing members are spaced apart from each other in the direction parallel to the intersecting edge, a material of the light guiding plate is absent between any two adjacent fixing members,
    wherein the plurality of fixing members have openings with the same orientation, the openings facing toward an end of the intersecting edge in the direction parallel to the intersecting edge, and a length of the fixing arm of the fixing member is less than a distance between two adjacent spot light sources, so that each of the plurality of spot light sources is allowed to be moved to a position between the fixing arm and the side end surface of the light guiding plate from a position between two fixing members via a corresponding one of the openings in the direction parallel to the intersecting edge.

2. The light guiding structure according to claim 1, wherein the spot light source comprises a light emitting diode.

3. The light guiding structure according to claim 2, wherein the light emitting diode has a power not greater than 6 watts.

4. The light guiding structure according to claim 1, wherein a distance between the fixing arm and the light guiding plate is approximately equal to the thickness of the spot light source.

5. The light guiding structure according to claim 1, wherein the fixing member and the light guiding plate are integrally formed by injection molding.

6. A backlight source, comprising a light bar and the light guiding structure according to claim 1.

7. The backlight source according to claim 6, wherein the spot light source comprises a light emitting diode.

8. The backlight source according to claim 7, wherein the light emitting diode has a power not greater than 6 watts.

9. The backlight source according to claim 6, wherein a distance between the fixing arm and the light guiding plate is approximately equal to the thickness of the spot light source.

10. The backlight source according to claim 6, wherein the fixing member and the light guiding plate are integrally formed by injection molding.

11. A display device, comprising a display panel and the backlight source according to claim 6.

* * * * *